(12) United States Patent
Andrewes

(10) Patent No.: US 8,065,808 B2
(45) Date of Patent: Nov. 29, 2011

(54) SUNDIAL WITH DOME AND GRID OF LIGHT

(76) Inventor: William J. H. Andrewes, Concord, MA (US)

( * ) Notice: Subject to any disclaimer, the term of this patent is extended or adjusted under 35 U.S.C. 154(b) by 0 days.

(21) Appl. No.: 12/879,734

(22) Filed: Sep. 10, 2010

(65) Prior Publication Data

US 2011/0061250 A1    Mar. 17, 2011

Related U.S. Application Data

(60) Provisional application No. 61/276,464, filed on Sep. 11, 2009.

(51) Int. Cl.
*G04B 49/02* (2006.01)

(52) U.S. Cl. .......................................................... 33/269

(58) Field of Classification Search .................... 33/268, 33/269, 270, 271
See application file for complete search history.

(56) References Cited

U.S. PATENT DOCUMENTS

| | | | | | |
|---|---|---|---|---|---|
| 2,762,123 | A | * | 9/1956 | Schultz et al. | 33/1 SA |
| 4,028,813 | A | * | 6/1977 | Eldridge | 33/270 |
| 4,520,572 | A | * | 6/1985 | Spilhaus | 33/270 |
| 5,062,212 | A | * | 11/1991 | Blaker | 33/270 |
| 5,197,199 | A | * | 3/1993 | Shrader | 33/270 |
| 5,596,553 | A | * | 1/1997 | Kellogg | 33/270 |
| 6,009,628 | A | * | 1/2000 | Mizushima | 33/270 |
| 7,114,262 | B2 | * | 10/2006 | Andrewes | 33/270 |
| 7,555,840 | B2 | * | 7/2009 | Chen | 33/269 |
| 2005/0060900 | A1 | * | 3/2005 | Maegli | 33/270 |
| 2005/0120570 | A1 | * | 6/2005 | Bastian | 33/268 |

* cited by examiner

*Primary Examiner* — G. Bradley Bennett
(74) *Attorney, Agent, or Firm* — Burns & Levinson LLP; Jerry Cohen

(57) ABSTRACT

Sundial apparatus with overlying barrier grid.

4 Claims, 6 Drawing Sheets

SUNDIAL WITH DOME AND GRID OF LIGHT

FIELD AND BACKGROUND OF THE INVENTION

The present invention relates to sundials. The present invention consists parts is a sundial that tells the time by a beam of light instead of a shadow and may be used for other purposes, e.g. harnessing solar energy.

Most sundials tell the time by a shadow cast by a rod (referred to as a "gnomon") or an edge (often called a "style"). The present invention uses a fine grid to project a beam of light that can indicate the time to the nearest minute or a nearest related sub-group of minutes e.g. five or ten minutes.

SUMMARY OF THE INVENTION

The invention comprises a dome-like sphere, the center of which is the center of the projection of the sundial. (See FIG. 1). The sphere is formed from narrow bars that run between its North and South axis and appear like a grid. The bars are arranged so that the spaces between them occur at intervals equal to one minute (or so) of time in the rotation of the Earth. Hence, there are 60 spaces for every hour of the Sun's apparent motion or less if the apparatus is derated to say five or ten minutes.

The bars are narrow, but extend in a radial path toward the center of the sphere a sufficient distance to allow sunlight to penetrate only if the Sun is directly aligned with that exact part of the sphere.

The bars thereby form a dome grid over the dial, and the grid allows the light to reach the dial plate only when the Sun is perpendicular to that part of the sphere, which occurs at a particular time of day. Hence, the beam of light that reaches the dial plate indicates the time by the Sun's position in the sky. As the Earth turns, so every consecutive minute is displayed on the dial plate.

The dome grid may be constructed in various ways but is preferably curved, e.g. part spherical. The important thing is that it should admit light only when the Sun is perpendicular to its surface.

The Sun's energy is most intense at the point where it is perpendicular to the surface of the sphere. Hence the grid of light forming the sphere takes maximum advantage of both light and heat from the Sun. Hence this design has an application in harnessing solar energy. Extruded glass lenses or glass beads might be used to magnify the Sun's rays and either project them on to a surface or transmit them down a fiber optic cable where the energy can be stored as heat or, with conversion, as electricity.

The dome and grid of light can be used on any kind of sundial surface—horizontal, vertical, inclined, or spherical—and has potential for application in fields other than time measurement.

The invention also has applications in architecture, offering many possibilities for the display or projection of light inside a building.

The dial, per se, shown in the accompanying illustrations may be, e.g. a five-meter diameter version of the Longitude Dial, an invention by the same author protected under U.S. Pat. No. 7,114,262 B2 (Oct. 3, 2006) as "Sundial with Standard Time Display."

Filters on bands inside the dome can be moved across the apertures in the grid to project colors on to the dial plate on special occasions during the year. On this model, the blue lines represent the Equator. the Tropic of Cancer, and the Tropic of Capricorn on the day when the sun is overhead one of these, its band is slid across so that the filters cover the apertures and color the beam of light being projected on to the dial plate below. The same thing can be done to highlight special occasions: a filter band positioned correctly for the appointed date can be used to cast a colored beam of light to show the sun's overhead location on the map on the day and also, if desired, at a particular time. See FIG. 5.

Other objects, features and advantages will be apparent from the following detailed description of preferred embodiments taken in conjunction with the accompanying drawings in which:

DETAILED DESCRIPTION OF PREFERRED EMBODIMENTS

Figure 1:
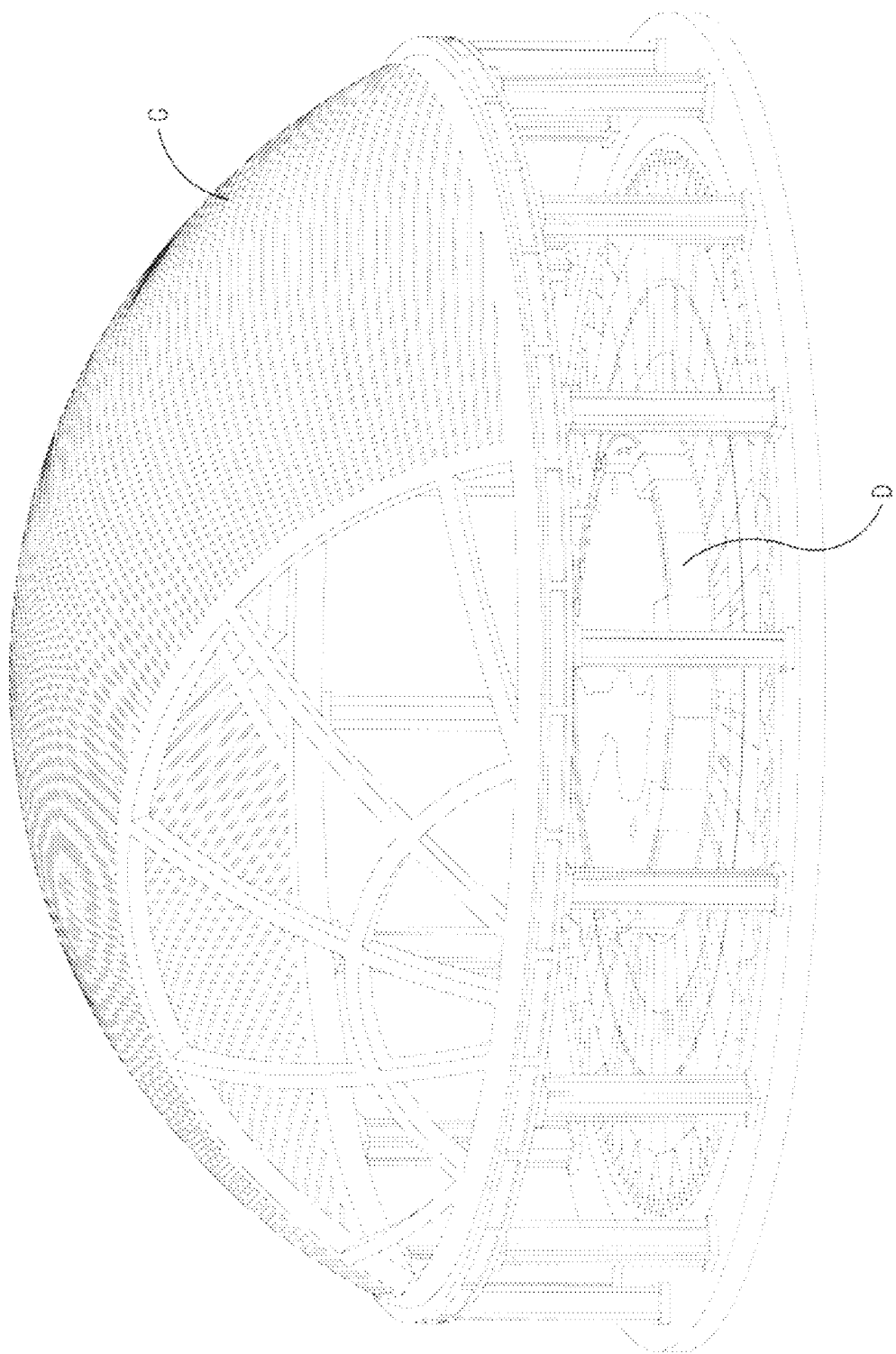
FIG. 1 is an isometric view of a sundial structure per a preferred embodiment of the invention.

The dial is shown at D in FIG. 1 and the dome barrier grid at G. The structure has dimensions derived as shown in FIG. 6.

Figure 2:
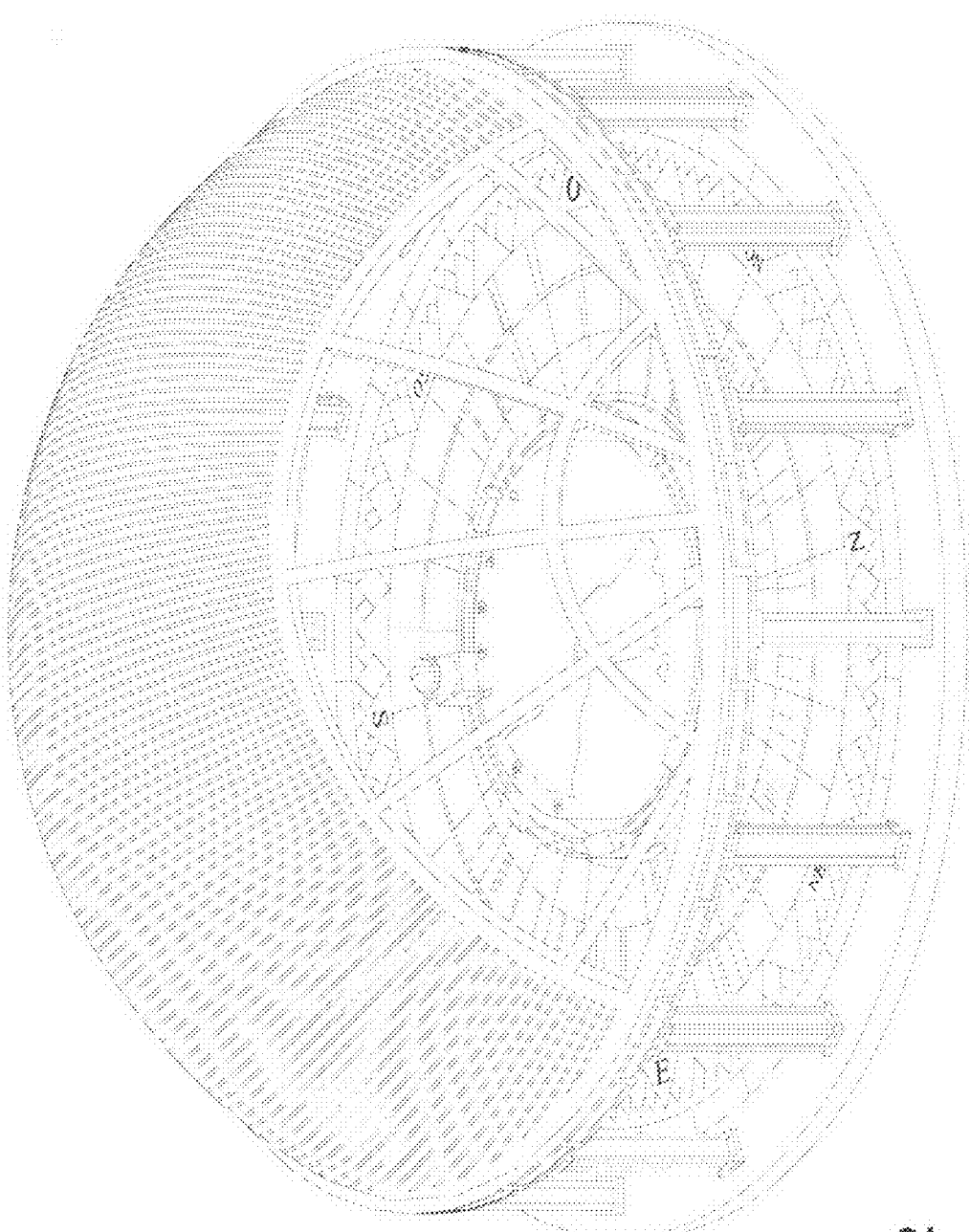
FIG. 2 is a view of the FIG. 1 structure from the Northeast.

As indicated in FIG. 2 the barrier grid is covering the area of the dome between Tropics of Cancer and Capricorn. The grid has spaced bars of sufficient depth to control sun rays direction to be perpendicular to target dial locations.

Figure 3:
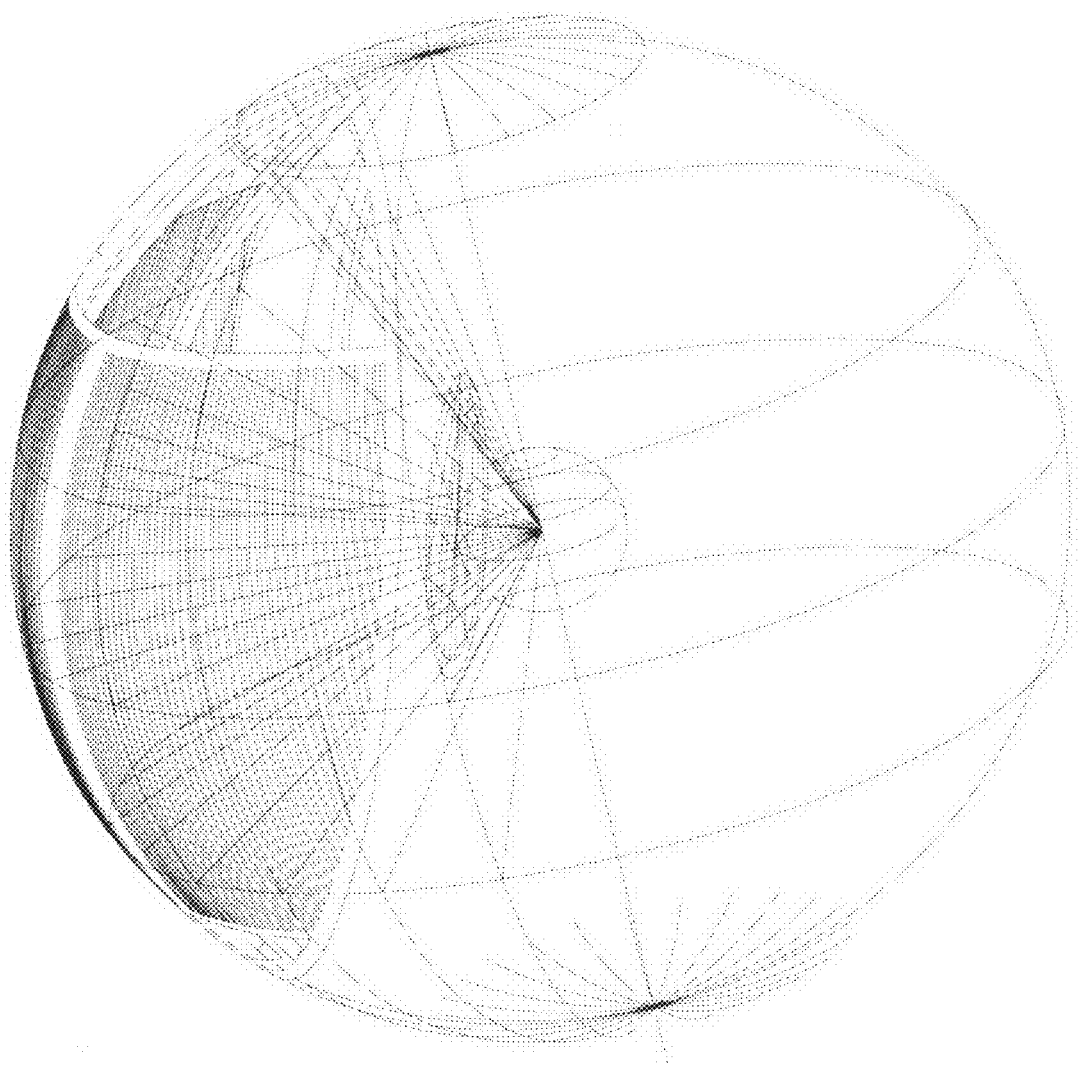
FIG. 3 expands the geometry showing of FIGS. 1 and 2.

FIG. 3 shows an expanded geometric for a sundial structure placed at latitude 17.5° and longitude 99.5° West (i.e. in Mexico).

Figure 4:
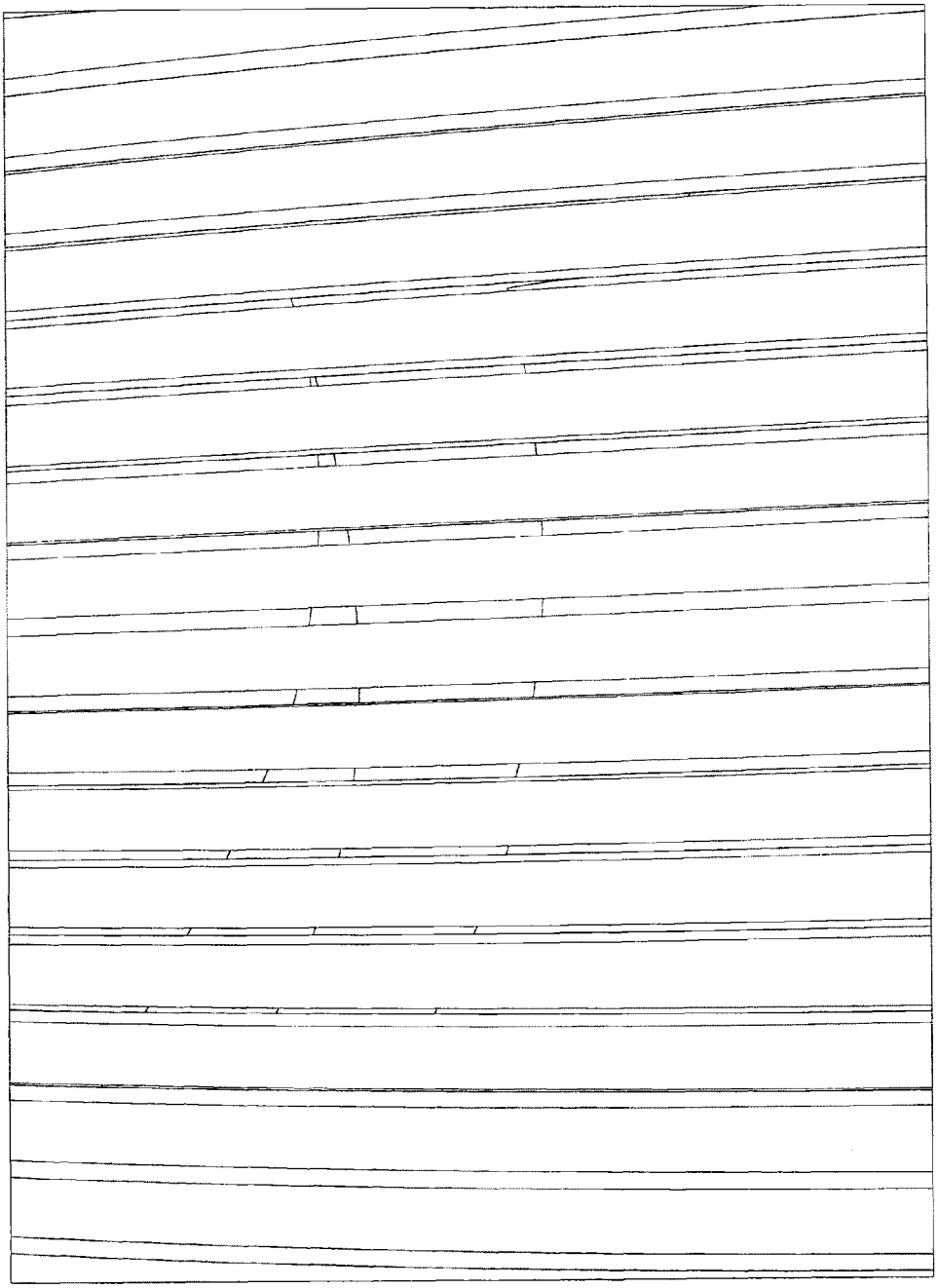
FIG. 4 shows an example of grid construction with spaces of minutes of width as selected.
Figure 5:
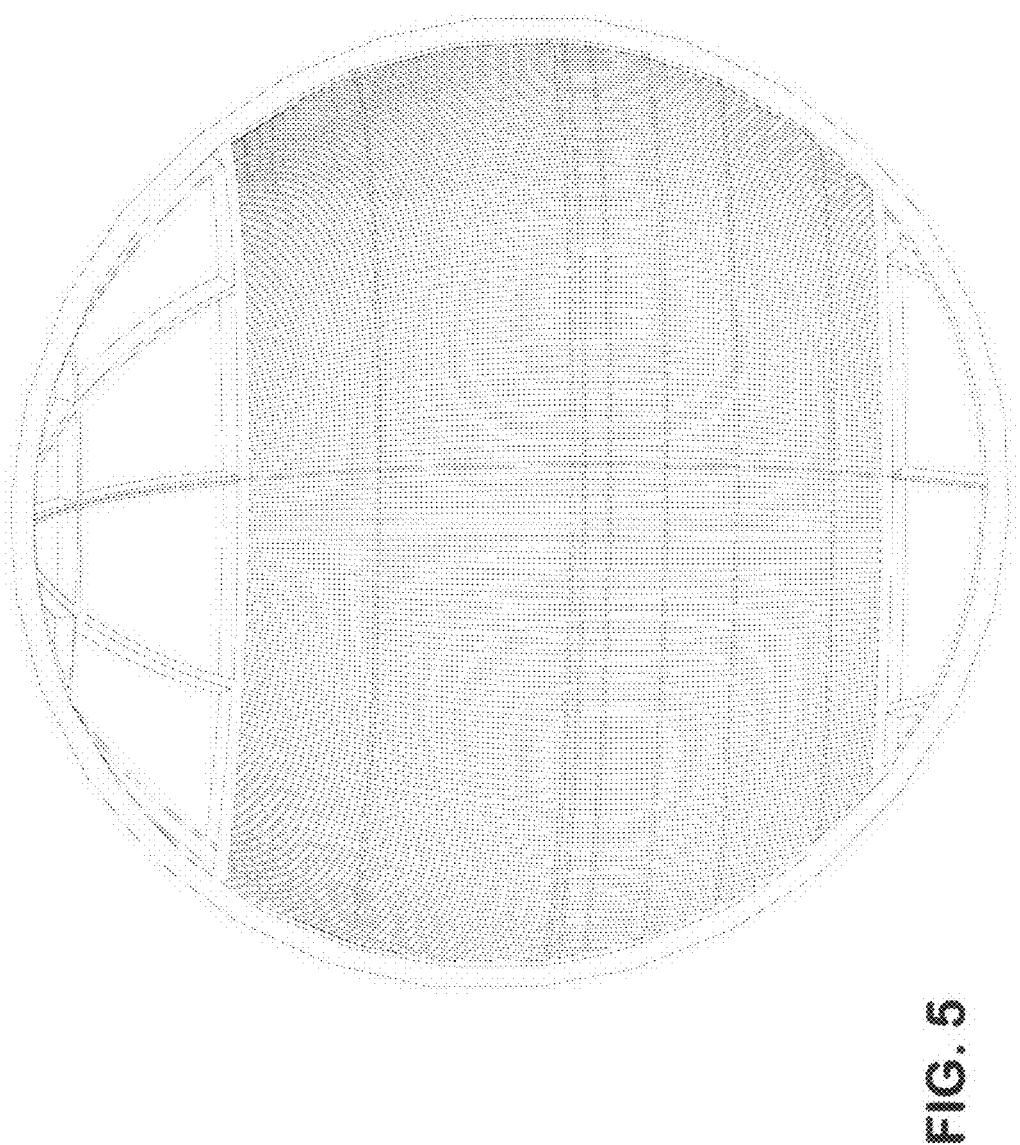
FIG. 5 is a view of the grid underside.
Figure 6:
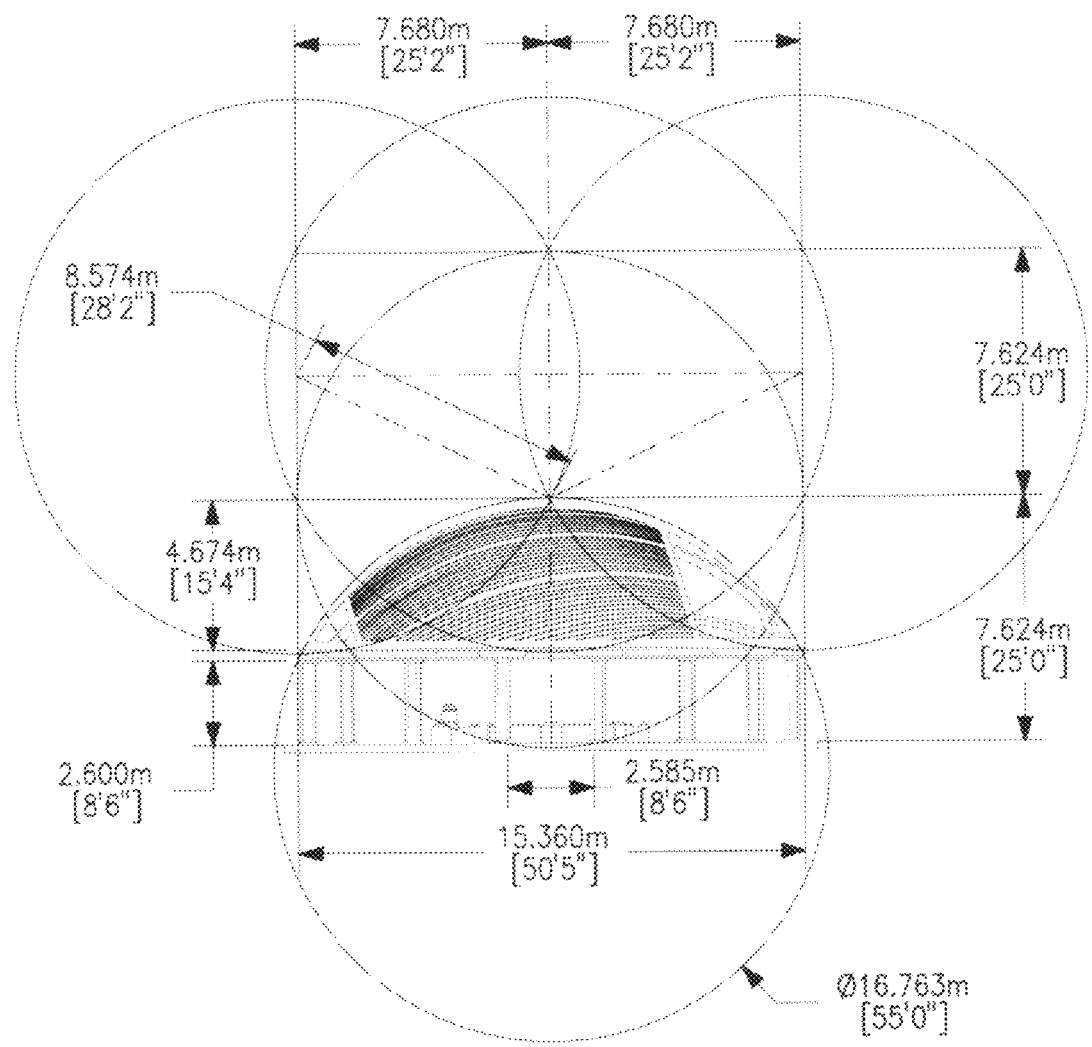
FIG. 6 is an expanded dimensional analysis of the FIGS. 1-5 embodiments.

The barrier grid per se on the top and underside is shown in FIGS. 4-5 and the proportions in FIG. 6. Markings may be provided on its underside to indicate various features such as meridians, equator, tropics, hours, half or quarter hours, special occasions marked by sun transit on that day and the like.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A sundial apparatus comprising:
   (a) a dial structure;
   (b) a light control barrier structure arranged over the dial structure and between it and the Sun allowing for variation of Sun position over a full or partial year;
   (c) the light control barrier structure constructed and arranged to admit sunlight rays toward the dial at specific times of day over several days of a selected year or year portion, i.e. allowing the rays to then penetrate the barrier structure and reach the dial, and for indicating correct time by direction to a designated portion of the dial structure.

2. The sundial apparatus of claim 1 wherein the dial has a flat or curved form with time indicators and the barrier structure comprises a spherical form with spaced bars aligned substantially radially vis-à-vis the Sun to dial path and of sufficient depth in the radial direction to assign a particular time and direction of beam penetration to the corresponding time indicator on the dial.

3. The sundial apparatus of claim 1 wherein corresponding time is when the admitted Sun rays are essentially perpendicular to the time indicator on the dial surface.

4. The sundial apparatus of claim 1 wherein the dial has a map of the Earth or Earth portion or other planets or solar systems portions and multiple time indicator beams fall to provide time simultaneous different time indications at different dial portions.

* * * * *